(12) United States Patent
Kuo et al.

(10) Patent No.: US 11,736,666 B2
(45) Date of Patent: Aug. 22, 2023

(54) DETECTION DEVICE, DETECTION SYSTEM AND DETECTION METHOD

(71) Applicant: ASUSTeK COMPUTER INC., Taipei (TW)

(72) Inventors: Chun-Liang Kuo, Taipei (TW); Chang-Yi Shen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 400 days.

(21) Appl. No.: 16/898,575

(22) Filed: Jun. 11, 2020

(65) Prior Publication Data

US 2020/0413010 A1 Dec. 31, 2020

(30) Foreign Application Priority Data

Jun. 28, 2019 (TW) .................. 108122990

(51) Int. Cl.
*G06F 1/32* (2019.01)
*H04N 7/18* (2006.01)
*G08B 13/196* (2006.01)

(52) U.S. Cl.
CPC ....... *H04N 7/188* (2013.01); *G08B 13/19602* (2013.01)

(58) Field of Classification Search
CPC .... H04N 7/188; H04N 5/772; H04N 5/23229; H04N 5/23203; H04N 5/23218; H04N 5/77; H04N 5/23241; H04N 5/2353; G08B 13/19602; G11B 27/34; G01C 11/02; G01C 11/00; G01C 11/025; G06F 1/3259; G06F 3/0317; G06F 3/03543; G06F 3/03547; G06F 3/0383; G06F 2203/0338; G06F 1/3206; G06F 21/00; G06F 1/26; G06F 1/32; G06F 1/3203; G06F 1/3209; G06F 1/3212; G06F 1/3215; G06F 1/3228; Y02D 10/00
See application file for complete search history.

(56) References Cited

U.S. PATENT DOCUMENTS

| | | | |
|---|---|---|---|
| 10,558,863 B2 | 2/2020 | Lau et al. | |
| 11,373,054 B2* | 6/2022 | Wang | ........... G06K 7/1417 |
| 2019/0199976 A1* | 6/2019 | Chao | ........... G08B 13/19695 |

FOREIGN PATENT DOCUMENTS

| | | |
|---|---|---|
| CN | 101653662 A | 2/2010 |
| CN | 104464138 B | 4/2017 |
| EP | 2549738 A1 | 1/2013 |
| TW | 201313012 A | 3/2013 |
| TW | 201909114 A | 3/2019 |

* cited by examiner

*Primary Examiner* — Hai Phan
*Assistant Examiner* — Anthony D Afrifa-Kyei
(74) *Attorney, Agent, or Firm* — McClure, Qualey & Rodack, LLP

(57) ABSTRACT

A detection system is disclosed herein, the detection system includes a first detection device. The first detection device operates at a first operating power to capture a first image data. Wherein, when the first detection device determines there are differences between a plurality of first frames in the first image data, the first detection device switches to operate at a second operating power to capture a second image data, and the first operating power is less than the second operating power. And the first detection device determines whether the second image data matches an identification data to generate a determining result, and generates a notification signal according to the determining result.

19 Claims, 3 Drawing Sheets

DETECTION DEVICE, DETECTION SYSTEM AND DETECTION METHOD

CROSS-REFERENCE TO RELATED APPLICATION

This application claims the priority benefit of Taiwan applications serial No. 108122990, filed on Jun. 28, 2019. The entirety of the above-mentioned patent application is hereby incorporated by reference herein and made a part of specification.

BACKGROUND OF THE INVENTION

Field of the Invention

This disclosure generally relates to a detection system, especially the detection system that generates a warning signal accordingly.

Description of the Related Art

The automatic detection system is conducted to many aspects of people's daily life. In addition to monitoring the safety of the environment, it is also used in smart electronic devices for drive automatically and execute corresponding functions according to detection changes of the environment.

However, if an error occurred in the detection system, it makes the electronic device keep operating for a long time or frequently switch between operation and shutdown, which causes a large amount of power consumption.

BRIEF SUMMARY OF THE INVENTION

According to the first aspect, a detection system is provided. The detection system includes a first detection device. The first detection device operates at a first operating power to capture a first image data. Wherein, when the first detection device determines there are differences between a plurality of first frames in the first image data, the first detection device switches to operate at a second operating power to capture a second image data, and the first operating power is less than the second operating power. The first detection device determines whether the second image data matches an identification data to generate a determining result, and generates a notification signal according to the determining result.

According to the second aspect, a detection method is provided. The detection method includes the following steps: controlling a first detection device to operate at a first operating power, to capture a first image data; determining a difference value between a plurality of first frames in the first image data; controlling the first detection device to switch to operate at a second operating power to capture a second image data when the difference value is greater than a preset value; determining whether the second image data matches an identification data to generate a determining result; and generating a notification signal according to the determining result.

A detection device is provided. The detection device includes a first detector, a first storage and a first processor. The first detector operates at a first operating power to capture a first image data. The first storage is configured to store an identification data. The first processor is electrically connected to the first detector and the first storage. When the first processor determines that there are differences between a plurality of first frames in the first image data received from the first detector, the detection device controls the first detector to switch to operate at a second operating power to capture a second image data. The first operating power is lower than the second operating power.

Since the detection system operates at a lower operating power, the detection system detects accurately at a higher operating power only when there is a change in the detection area. Therefore, it ensures that the detection system does not consume too much energy due to long time driving. In this way, the detection system, the detection device and the detection method are taking into account the accuracy of detection and energy utilization.

DETAILED DESCRIPTION OF THE EMBODIMENTS

A plurality of embodiments of this disclosure is disclosed below by using figures. For clear description, many practical details are described together in the following statement. However, it should be learnt that these practical details should not be intended to limit this disclosure. That is, in some embodiments of this disclosure, these practical details are unnecessary. In addition, to simplify the figures, some conventional common structures and elements are illustrated in a simple schematic manner in the figures.

In the disclosure, the term "connect" or "couple" means "electrically connect" or "electrically couple". The term "connect" or "couple" also means the interaction or cooperation between/among two or more components. In addition, the words "first", "second" and the like are configured to distinguish individual elements/operations that have the same technical terms, but not refer to any special item or imply any sequence unless expressly stated.

Figure 1:
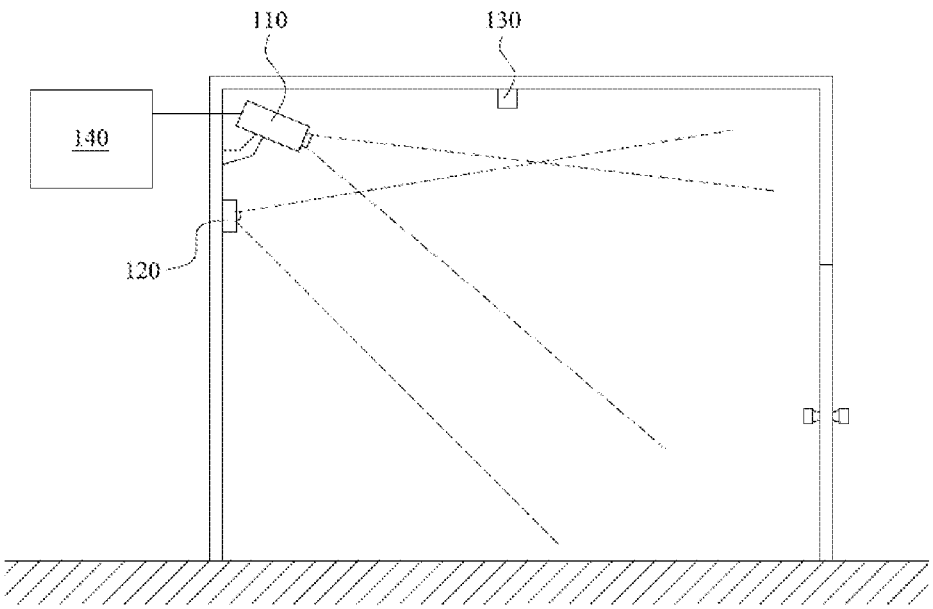
FIG. 1 is a schematic diagram of a detection system according to some embodiments.
Figure 2:
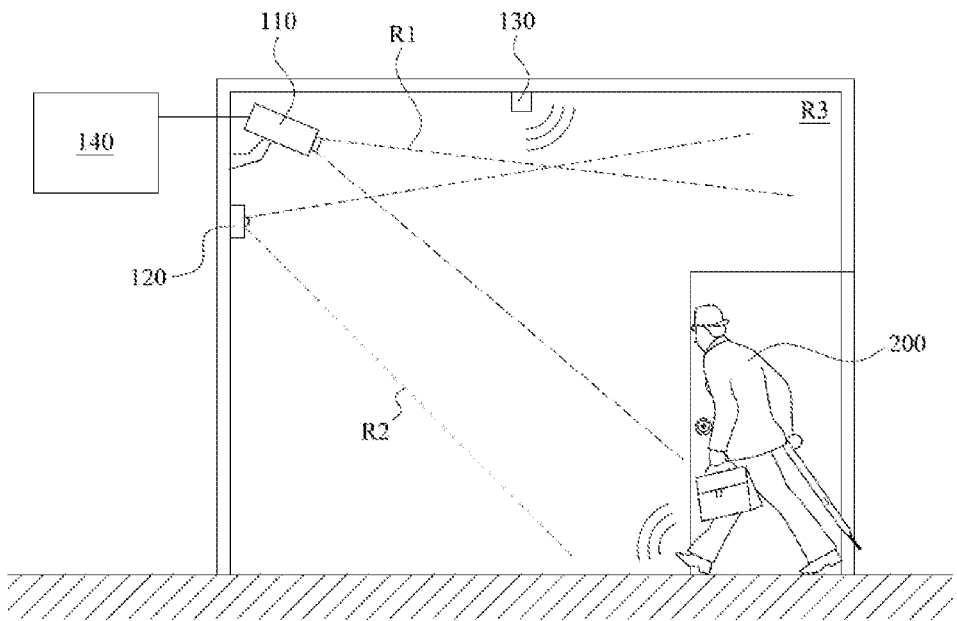
FIG. 2 is a schematic diagram of an operating ways of the detection system according to some embodiments.

Please refer to FIG. 1 and FIG. 2, which are schematic diagrams of a detection system 100 according to some embodiments. The detection system 100 includes a first detection device 110. In some embodiments, the first detection device 110 is a camera to detect the environmental change of a first detection area R1, which is not limited herein. The first detection device 110 is any electronic device with images capturing function in some embodiments.

When the first detection device 110 operates at a first operating power, the first detection device 110 captures a first image data, and when the first detection device 110 operates at a second operating power, the first detection device 110 captures a second image data. In an embodiment, the first image data is a first video, and the second image data is a second video. The first video includes a plurality of first frames, and the second video includes a plurality of second frames. The first operating power is less than the second operating power. That is, the power consumption of the first operating power is less than that of the second operating power. The details of the different operating powers are detailed later.

After the first detection device 110 captures the first video, the first detection device 110 determines whether difference exists between the first frames in the first video. When the first detection device 110 determines that difference exists between these first frames, the first detection device 110 switches from operating at the first operating power to operating at the second operating power, to capture the second video. In another embodiment, the first image data is a static image, and the first detection device 110 periodically captures the first image data as the first frame. Then, the first detection device 110 determines a difference value between two adjacent first frames. The first detection device 110 determines that there is a change in the first image data when the difference value is greater than a preset value. In an embodiment, the first detection device 110 determines whether the difference value between two adjacent first frames is greater than the preset value or not through a first processor internally. In other embodiments, the first detection device 110 determines whether the difference value between two adjacent first frames is greater than the preset value or not through a processor of an external computer.

When the first detection device 110 confirms that difference exists in the first image data, the operation of the first detection device 110 switches from the first operating power to the second operating power and captures the second image data. Then, the first detection device 110 further determines whether the second image date matches pre-stored identification data or not to generate a determining result, and generates a corresponding notification signal according to the determining result as "matching" or "mismatching". In an embodiment, the notification signal triggers an electronic equipment to operate, such as to turn on a lighting equipment or an air conditioning equipment. In other embodiments, the notification signal is a detection record used to record the current time point, and store the second image data.

In an embodiment, the identification data includes a face image. According to the identification data, the first detection device 110 determines whether the second image data includes a frame that matches the face image in the identification data or not. In the embodiment, the identification data is stored in a storage device of the first detection device 110 or in a storage device of an external server 140 that electrically connected to the first detection device 110. In an embodiment, the identification data is a resident information. When the second image data does not match the identification data (for example, a visitor in the second image data does not match the resident information), the notification signal generated by the first detection device 110 is used to generate a warning message or a warning sound to inform a management system or a manager that the visitor is a non-resident. When the second image data matches the identification data, the notification signal generated by the first detection device 110 triggers the lighting equipment or the air-conditioning equipment.

In an embodiment, the first detection device 110 operates at the first operating power and captures the first image data with lower power consumption to determine whether there is a change in the first detection area. Then, when the first detection device 110 determines that there is a change in the first detection area R1 based on the first image data, the first detection device 110 switches to operate at the second operating power, and captures the second image data to compare with the identification data for subsequent identification recognition. In this way, the first detection device 110 does not operate at the high power consumption (that is, the second operating power) for a long time, and at the same time, the detection performance of the detection system 100 is kept.

In some embodiments, when the first detection device 110 operates at the first operating power, the first image data is captured with a first resolution. When the first detection device 110 is operated at the second operating power, the second image data is captured with a second resolution, and the first resolution is lower than the second resolution. In an embodiment, when the first detection device 110 operates at the first operating power, it captures the first image data with the first resolution, such as 300 dpi. When the first detection device 110 operates at the second operating power, it captures the second image data with the second resolution, such as 720 dpi. In an embodiment, the first image data is used to determine whether there is a change in the first detection area (such as visitors in and out), so the first image data is no need to have high resolution. When the first detection device 110 determines that a visitor enters or exits from the first detection area based on the first image data, it switches to operate at the second operating power and captures the second image data with the second resolution. Then, the first detection device determines whether the second image data matches the pre-stored identification data, to identity of the visitor, so the second image data is required to have a higher resolution. In this embodiment, the first detection device 110 operating at the second operating power only captures the image of the changed area in the first detection area (such as, the image of the area with visitors) as the second image data. After determining whether the second image data matches the pre-stored identification data or not (in an embodiment, determining whether the visitor is a resident or not), the first detection device 110 is switched to operate at the first operating power, and captures the entire area images with a visitor in the first detection area as the first image data, and records the entire area images with a visitor in the first detection area. In another embodiment, after determining whether the second image data matches the pre-stored identification data or not (in an embodiment, determining whether the visitor is a resident or not), the first detection device 110 keeps operating at the second operating power, and captures the entire area images with the first detection area as the second image data.

As mentioned above, the first detection device 110 in this disclosure captures images with "different resolutions" or images with "different area ranges" at different operating powers.

In an embodiment, the detection system 100 further includes a second detection device 120. The second detection device 120 detects the environmental changes in the second detection area, and generates a first sensing signal when the environmental changes in the second detection area R2 (for example when a target, such as a visitor 200, enters the room). The second detection device 120 includes an infrared detector, a sound detector or a light detector, but the detection method of the second detection device 120 is different from the first detection device 110. The second detection area R2 is greater than or equal to the first detection area R1, and the two areas at least partially overlap. In some embodiments, the first detection device 110 includes a first detection view angle (such as an image capturing angle of the camera), the second detection device 120 includes a second detection view angle (such as a detection angle of the infrared detector), and the first detection view angle is less than or equal to the second detection view angle.

In addition, the operating power of the second detection device 120 is less than the first operating power of the first detection device 110. In an embodiment, the second detection device 120 is an infrared detector. When the second detection device 120 detects that a visitor enters the second detection area R2, the second detection device 120 generates the first sensing signal, and drives the first detection device 110 operates at the first operating power and captures the first image data according to the first sensing signal.

In an embodiment, the detection system 100 further includes a third detection device 130. The third detection device 130 detects environmental changes in a third detection area, and generates a second sensing signal when determining that an environmental change occurs in the third detection area. In an embodiment, to detect the sound of footsteps when the visitor 200 enters or approaches the room. The third detection device 130 includes an infrared detector, a sound detector, or a light detector, but the detection method of the third detection device 130 is different from the first detection device 110 and the second detection device 120. The third detection area R3 is greater than or equal to the second detection area R2. In the embodiment shown in FIG. 2, the third detection area R3 covers the internal space of the room and the external space close to the door. In this embodiment, the third detection device 130 is a sound detector to detect the sound of footsteps inside and outside the room. When the sound volume received exceeds the preset decibel value, the third detection device 130 generates the second sensing signal.

In an embodiment, the operating power of the third detection device 130 and the operating power of the second detection device 120 are both less than the first operating power of the first detection device 110. In an embodiment, the operating power of the third detection device 130 with the largest detection range is less than the operating power of the second detection device 120, wherein the operating power of the second detection device 120 is the lowest. In this way, the detection accuracy of the detection system 100 is maintained and the energy consumption problems is reduced in a multi-stage detection mode.

In an embodiment, both the second detection device 120 and the third detection device 130 are continuously maintained in an operating state. The first detection device 110 only operates at the first operating power when it receives the first sensing signal from the second detection device 120 and the second sensing signal from the third detection device 130. In another embodiment, the third detection device 130 is in an operating state and the second detection device 120 is sleep or shutdown. The second sensing signal generated by the third detection device 130 is used to wake up or drive the second detection device 120 to detect the environmental changes in the second detection area. Then, the second detection device 120 generates the first sensing signal to drive the first detection device 110 to sleep or shutdown when detecting the visitor 200. According to this, through three different detection methods and different detection ranges of the detection devices 110 to 130, the detection sensitivity and accuracy of the detection system 100 are improved. In an embodiment, the first detection device 110, the second detection device 120, and the third detection device 130 are respectively detect the first detection area R1, the second detection area R2, and the third detection area R3 in different ways.

In an embodiment, if the identification data represents a "blacklist" data, the notification signal triggers the first detection device 110 or an alarm device to sound. In other embodiment, the detection system 100 further includes a server 140. The server 140 is connected to the first detection device 110 through the Internet. When the notification signal is generated, the first detection device 110 transmits the second image data to the server 140 to perform subsequent operations, such as: notifying the manager of the detection system 100, or storing the second image data to the storage device in the server 140.

Figure 3:
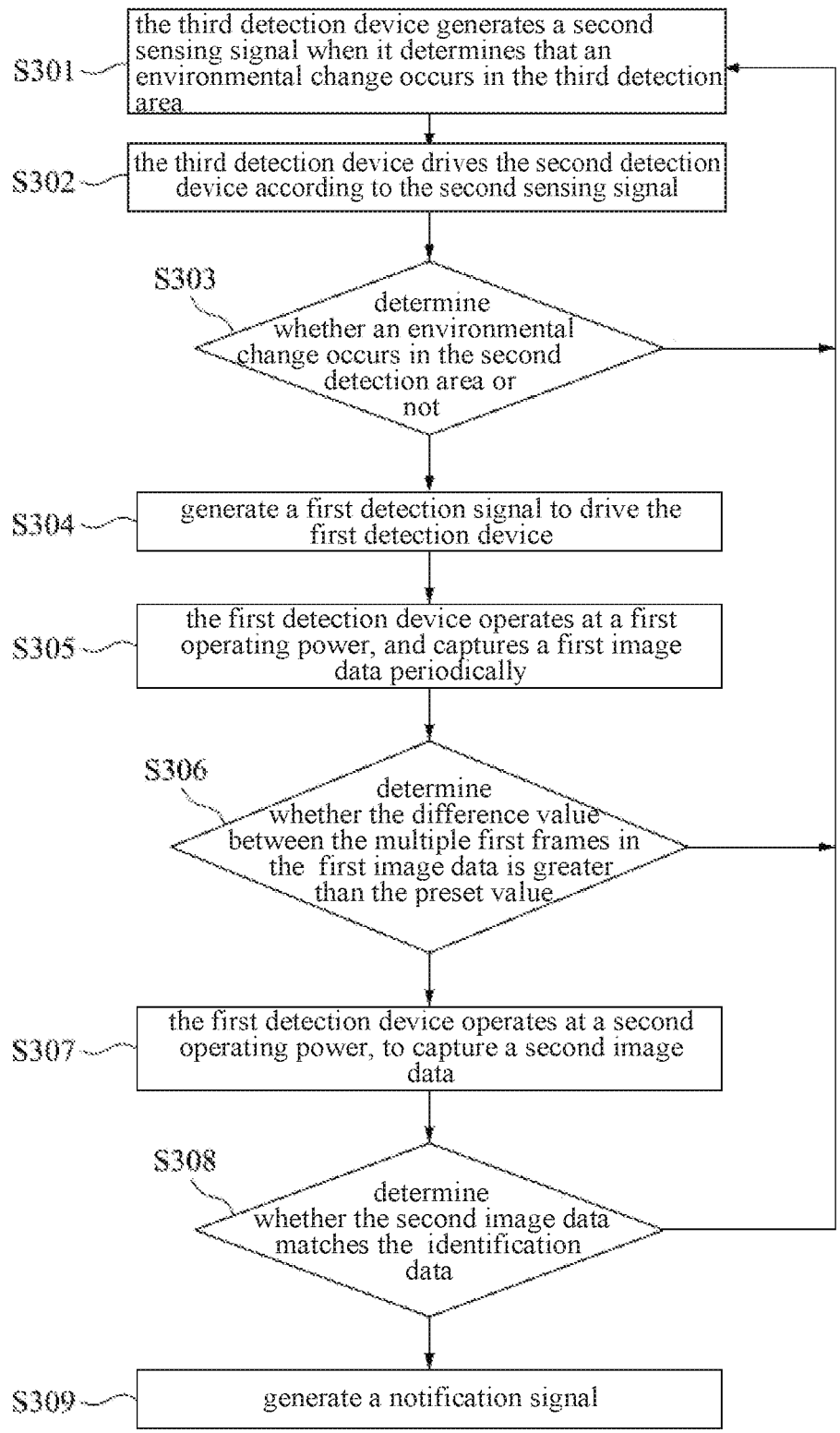
FIG. 3 is a flow diagram of a detection method according to some embodiments.

Please refer to FIG. 3, which is a schematic diagram of the detection method in some embodiments. The detection method includes step S301 to step S309. In the step S301, the third detection device 130 determines whether an environmental change occurs in the third detection area R3 or not. In an embodiment, to determine whether there is the sound or light in the third detection area R3 or not. When the third detection device 130 determines that an environmental change occurs in the third detection area R3, the third detection device 130 generates the second sensing signal. In the step S302, the third detection device 130 drives the second detection device 120 according to the second sensing signal.

In the step S303, the second detection device 120 determines whether an environmental change occurs in the second detection area R2 or not. In an embodiment, to determine whether a visitor enters the second detection area R2 by infrared. In the step S304, when the second detection device 120 determines that an environmental change occurs in the second detection area R2, the first sensing signal is generated to drive the first detection device 110.

In the step S305, the first detection device 110 operates at the first operating power, and periodically captures the first image data. As mentioned above, when the first detection device 110 is operated at the first operating power, the first detection device 110 captures images with the first resolution (lower resolution) as the first image data. In an embodiment, the first frame in the first image data covers entire of the first detection area R1 or a part of the first detection area R1.

In the step S306, the processor in the first detection device 110 determines whether the difference value between the multiple adjacent first frames in the first image data is greater than the preset value. In the step S307, when the difference value is greater than the preset value, it means that an environmental change occurs in the first detection area R1. At this time, the first detection device 110 is switched from operating at the first operating power to operating at the second operating power. When the first detection device 110 operates at the second operating power, the first detection device 110 captures images with the second resolution (higher resolution) as the second image data, and the second frames in the second image data cover entire of the first detection area R1 or a part of the first detection area R1.

In the step S308, the first detection device 110 compares the second image data with the identification data to determine whether they are matching or not. In an embodiment, the identification data including face images, or profile recognition images is used to determine whether the second image data matches them.

In the step S309, if the second image data matches the identification data, the first detection device 110 generates the notification signal. In an embodiment, when the notification signal is generated, the first detection device 110 transmits the second image data to the server 140 and performs subsequent operations, such as notifying the manager of the detection system 100, or storing the second image data to the storage device in the server 140.

In an embodiment, when the second detection device 120 determines that there is no environmental change in the second detection area R2, the second detection device 120 continues detecting for a period of time. Then, when there is still no environmental change in the second detection area R2, stop the detection. Similarly, when the first detection device 110 determines that there is no environmental change in the first detection area R1, the second detection device 120 continues determining for a period of time. When there is still no environmental change in the first detection area R1, stop the detection.

In an embodiment, the third detection device 130 and the second detection device 120 continuously perform the detection steps.

Figure 4:
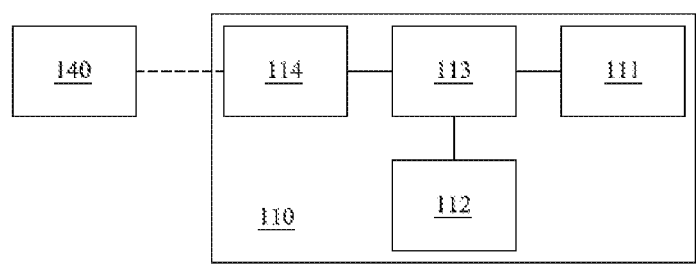
FIG. 4 is a schematic diagram of a detection device according to some embodiments.

Please refer to FIG. 4 for a detailed description of the first detection device 110. In an embodiment, the first detection device 110 includes a first detector 111, a first storage 112 and a first processor 113. In an embodiment, the first detector 111 is a recording device for capturing the first image data at the first operating power and the second image data at the second operating power. In an embodiment, the first storage 112 is a non-volatile memory, a volatile memory, a random access memory, a write-only memory, a flash memory, an electronic erasable rewritable read-only memory, other types of memory, or a combination of the above. In an embodiment, the first processor 113 is a central processor unit (CPU), a microprocessor (MCU), a server, or other circuits or components with data access function, data calculation function, data storage function, data transmission and reception function, or similar functions.

The first storage 112 is configured to storage the identification data. As mentioned above, the identification data is the face images or the profile recognition frames. The first processor 113 is electrically connected to the first detector 111 and the first storage 112. The first processor 113 receives the first image data from the first detector 111, and determines whether there are differences between the multiple adjacent first frames in the first image data or not, to determine whether there is an environmental change in the first detection area R1 or not. When there are differences between the multiple adjacent first frames (that is, an environmental change occurs in the first detection area R1), the first processor 113 controls the first detector 111 to operate at the second operating power, and capture the second image data. Then, the first processor 113 determines whether the second image data matches the identification data received from the first storage 112 to generate a determining result, and generates a corresponding notification signal according to the determining result as "matching" or "mismatching".

In another embodiment, the first detection device 110 further includes a first transmitter 114. The first transmitter 114 is connected to the server 140 through a wireless network or the Internet, so that the first detection device 110 transmits the second image data to the server 140.

The elements, method steps, or technical features in the foregoing embodiments can be combined with each other, without being limited to the order of text description or the presentation of the drawings in the disclosure.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A detection system, comprising:
    a first detection device, operating at a first operating power to capture a first image data wherein the first detection device is configured to detect a first detection area according to the first image data, and the first image data comprises a plurality of first frames;
    wherein, when the first detection device determines whether a difference value between the plurality of first frames in the first image data is greater than a preset value to determine whether there is an environmental change in the first detection area, the first detection device switches to operate at a second operating power and captures a second image data, the first operating power is less than the second operating power; and the first detection device determines whether the second image data matches an identification data or not and generates a determining result, and outputs a notification signal according to the determining result.

2. The detection system according to claim 1, wherein the plurality of first frames of the first image data covers entire of the first detection area or a part of the first detection area, and a plurality of second frames of the second image data covers entire of the first detection area or a part of the first detection area.

3. The detection system according to claim 1, wherein the first image data has a first resolution, and the second image data has a second resolution, and the first resolution is lower than the second resolution.

4. The detection system according to claim 1, wherein the detection system further comprises:
    a second detection device, for detecting a second detection area, to generate a first sensing signal to drive the first detection device to operate at the first operation power, wherein the second detection area is greater than or equal to the first detection area.

5. The detection system according to claim 4, wherein the second detection device comprises an infrared detector, a sound detector or a light detector.

6. The detection system according to claim 5, further comprising:
    a third detection device, for detecting a third detection area, to generate a second sensing signal, wherein the third detection area is greater than or equal to the second detection area.

7. The detection system according to claim 6, wherein the first detection device, the second detection device and the third detection device respectively detect the first detection area, the second detection area and the third detection area in different ways.

8. The detection system according to claim 1, further comprising:
    a server, connecting to the first detection device, to receive the second image data transmitted from the first detection device.

9. A detection method, comprising:
    controlling a first detection device to operate at a first operating power, to capture a first image data, wherein the first detection device is configured to detect a first detection area according to the first image data, and the first image data comprises a plurality of first frames;
    determining whether a difference value between the plurality of first frames in the first image data is greater than a preset value to determine whether there is an environmental change in the first detection area;
    controlling the first detection device to switch to operate at a second operating power to capture a second image data when the difference value is greater than the preset value;

determining whether the second image data matches an identification data or not to generate a determining result; and generating a notification signal according to the determining result.

10. The detection method according to claim 9, wherein the first image data has a first resolution, and the second image data has a second resolution, and the first resolution is lower than the second resolution.

11. The detection method according to claim 9, wherein the first frames in the first image data cover entire of the first detection area or a part of the first detection area, and a plurality of second frames in the second image data cover entire of the first detection area or a part of the first detection area.

12. The detection method according to claim 9, before controlling the first detection device to operate at the first operating power to capture the first image data, the detection method further comprising:

detecting a second detection area by a second detection device, to generate a first sensing signal, wherein the second detection area is greater than or equal to the first detection area; and driving the first detection device to operate at the first operating power according to the first sensing signal.

13. The detection method according to claim 12, before the step of detecting the second detection area by the second detection device, the detection method further comprising:

detecting a third detection area by a third detection device, to generate a second sensing signal, and driving the second detection device according to the second sensing signal, wherein the third detection area is greater than or equal to the second detection area.

14. The detection method according to claim 13, wherein the first detection device, the second detection device and the third detection device respectively detect the first detection area, the second detection area and the third detection area in different ways.

15. The detection method according to claim 9, further comprising:

transmitting the second image data to a server.

16. A detection device, comprising:

a first detector, operating at a first operating power to capture a first image data, wherein the detection device is configured to detect a first detection area according to the first image data, and the first image data comprises a plurality of first frames;

a first storage, for storing an identification data; and a first processor, electrically connecting to the first detector and the first storage, wherein when the first processor determines that a difference value between the plurality of first frames in the first image data received from the first detector is greater than a preset value to determine whether there is an environmental change in the first detection area, controlling the first detector to switch to operate at a second operating power to capture a second image data, the first operating power is lower than the second operating power.

17. The detection device according to claim 16, wherein the first processor determines whether the second image data matches the identification data or not to generate a determining result, and generates a notification signal according to the determining result.

18. The detection device according to claim 16, wherein the first image data has a first resolution, and the second image data has a second resolution, the first resolution is lower than the second resolution.

19. The detection device according to claim 16, wherein the first frames of the first image data cover entire of the first detection area or a part of the first detection area, and a plurality of second frames of the second image data cover entire of the first detection area or a part of the first detection area.

* * * * *